United States Patent
Wang et al.

(10) Patent No.: US 10,749,998 B2
(45) Date of Patent: Aug. 18, 2020

(54) ELECTRONIC DEVICE AND USB TYPE-C INTERFACE USED FOR ELECTRONIC DEVICE

(71) Applicant: HUAWEI TECHNOLOGIES CO., LTD., Shenzhen (CN)

(72) Inventors: Xiaolong Wang, Shenzhen (CN); Qiliang Wang, Shanghai (CN); Gaofeng Wang, Shenzhen (CN); Hui Li, Shenzhen (CN); Xuelong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/092,020

(22) PCT Filed: Apr. 8, 2016

(86) PCT No.: PCT/CN2016/078884
§ 371 (c)(1),
(2) Date: Oct. 8, 2018

(87) PCT Pub. No.: WO2017/173663
PCT Pub. Date: Oct. 12, 2017

(65) Prior Publication Data
US 2019/0116250 A1    Apr. 18, 2019

(51) Int. Cl.
*H04M 1/00*    (2006.01)
*H04M 1/02*    (2006.01)
*H01R 24/60*    (2011.01)
*H01R 12/72*    (2011.01)

(52) U.S. Cl.
CPC ....... *H04M 1/0274* (2013.01); *H04M 1/0266* (2013.01); *H01R 12/724* (2013.01); *H01R 24/60* (2013.01); *H04M 1/0202* (2013.01); *H04M 1/0295* (2013.01)

(58) Field of Classification Search
CPC ............. H04M 1/0274; H04M 1/0266; H04M 1/0202; H04M 1/0295; H01R 12/724; H01R 24/60
See application file for complete search history.

(56) References Cited

U.S. PATENT DOCUMENTS

| | | | |
|---|---|---|---|
| 7,771,237 B2 | 8/2010 | Lei et al. | |
| 8,827,742 B2 | 9/2014 | Wang | |
| 2001/0031584 A1 | 10/2001 | Claus et al. | |
| 2010/0261385 A1* | 10/2010 | Zheng ................. | H01R 13/658 439/607.01 |
| 2010/0322566 A1 | 12/2010 | Zheng et al. | |

(Continued)

FOREIGN PATENT DOCUMENTS

| | | |
|---|---|---|
| CN | 202159823 U | 3/2012 |
| CN | 202840058 U | 3/2013 |

(Continued)

*Primary Examiner* — Khai M Nguyen
(74) *Attorney, Agent, or Firm* — Kilpatrick Townsend & Stockton LLP (57) ABSTRACT

This application relates to a hardware interface, and in particular, to a USB Type-C interface used for an electronic device. In this application, a step is disposed on the USB Type-C interface to place a display screen. This shortens a distance from a front display screen of the electronic device to an edge of the electronic device, and increases a screen-to-body ratio.

19 Claims, 10 Drawing Sheets

(56) References Cited

U.S. PATENT DOCUMENTS

| | | |
|---|---|---|
| 2013/0176181 A1 | 7/2013 | Mo et al. |
| 2013/0183844 A1 | 7/2013 | Wang |
| 2015/0207273 A1 | 7/2015 | Zhao et al. |
| 2016/0093994 A1* | 3/2016 | Chen .................... H01R 12/724 |
| | | 439/607.01 |
| 2016/0233606 A1* | 8/2016 | Zhao .................. H01R 13/5202 |
| 2016/0294108 A1 | 10/2016 | Tsai et al. |
| 2017/0110835 A1* | 4/2017 | Hasegawa .......... H01R 13/6683 |
| 2017/0249271 A1* | 8/2017 | Gagne-Keats ...... G06F 13/4282 |
| 2017/0358895 A1* | 12/2017 | Chung ............... H01R 13/6594 |
| 2018/0046421 A1* | 2/2018 | Mazurek .................. G06F 3/14 |
| 2018/0205809 A1 | 7/2018 | Luo et al. |

FOREIGN PATENT DOCUMENTS

| | | |
|---|---|---|
| CN | 202840060 U | 3/2013 |
| CN | 203589324 U | 5/2014 |
| CN | 203707446 U | 7/2014 |
| CN | 204144595 U | 2/2015 |
| CN | 104618529 A | 5/2015 |
| CN | 104752906 A | 7/2015 |
| CN | 204538338 U | 8/2015 |
| CN | 104916960 A | 9/2015 |
| CN | 104994190 A | 10/2015 |
| CN | 105356119 A | 2/2016 |
| JP | 2011003538 A | 1/2011 |

* cited by examiner

ELECTRONIC DEVICE AND USB TYPE-C INTERFACE USED FOR ELECTRONIC DEVICE

TECHNICAL FIELD

Embodiments of the present invention relate to a hardware interface, and in particular, to a USB Type-C (Universal Serial Bus Type-C) interface used for an electronic device.

BACKGROUND

Power and data interfaces of mainstream smartphones are being fully converted from micro USB interfaces to USB Type-C interfaces, and structure designs thereof are becoming increasingly compact. A ratio of a screen area to an area of a front surface of a mobile phone body, that is, a screen-to-body ratio, directly reflects a compact degree of a structure design, and is also an important criterion for evaluating, by consumers, whether an appearance of a mobile phone is attractive. Therefore, the screen-to-body ratio has received much attention from mobile phone manufacturers.

SUMMARY

In view of this, embodiments of the present invention provide an electronic device with a USB Type-C interface, so as to increase a screen-to-body ratio of the electronic device and provide desirable user experience.

According to one aspect, an embodiment of the present invention provides a USB Type-C interface. The USB Type-C interface includes a conductive tongue and a metal protective case. A rear part of the conductive tongue is connected to the metal protective case. The metal protective case encloses the conductive tongue. A step is disposed on the top of a rear side of the conductive tongue and is configured to place a display screen. A shape of the metal protective case matches a shape of the step.

In this implementation, a part of an end part of the display screen is placed on the step, so that a part of the USB Type-C interface is hidden behind the display screen. The USB Type-C interface and the display screen are placed in a staggered manner. This shortens a distance from the display screen to an edge of the electronic device and increases a screen-to-body ratio.

In a possible implementation, the display screen may be a display screen with a touch control function.

In a possible implementation, the USB Type-C interface further includes a pin. The pin extends from the metal protective case and is configured to fasten the USB Type-C interface onto a body of the electronic device.

In a possible implementation, the pin is disposed at the bottom of the metal protective case, so that the display screen is not prevented from being combined with the USB Type-C interface.

In a possible implementation, the pin is further disposed on two sides of the metal protective case, so as to provide a better fastening function.

In a possible implementation, when providing a fastening function, the pin may also provide a conductive function.

In a possible implementation, the USB Type-C interface further includes a conductive part. The conductive part is electrically connected to the rear part of the conductive tongue and is configured to conduct a current between the body and the conductive tongue.

In a possible implementation, an arc transition part is provided on the step, so that a structure of the USB Type-C interface at the step is smooth.

In a possible implementation, the metal protective case is formed integrated, and the arc transition part is bent.

In a possible implementation, a part, jointed with the display screen, of the step is of a shape that matches a shape of the display screen, so that the step is more closely combined with the display screen.

In a possible implementation, a depth of the step is predetermined, so that a height of the USB Type-C interface matches a height of the display screen after the USB Type-C interface is combined with the display screen, to facilitate installation of another element.

In a possible implementation, a cushion layer is provided on a surface of the step, to protect the display screen.

In a possible implementation, the cushion layer may be a rubber coating, a plastic coating, a foam coating, a resin coating, a fiber coating, a glue coating, or the like that is made of a flexible material.

According to another aspect, an embodiment of the present invention provides an electronic device. The electronic device includes a body and a USB Type-C interface. The body includes a display screen. The USB Type-C interface is disposed on a tail part of the body. A step is disposed on the top of a rear side of the USB Type-C interface. The display screen is placed on the step.

A same part between the USB Type-C interface in this implementation and the USB Type-C in the foregoing implementations is not repeated.

In a possible implementation, the electronic device further includes a touchscreen. The touchscreen and the display screen are separated from each other and overlapped vertically.

In a possible implementation, a size of the step matches a size of the display screen, so that a top part of the USB Type-C interface is leveled with an upper surface of the display screen. The touchscreen is disposed on a plane formed by splicing the USB Type-C interface and the display screen.

According to still another aspect, an embodiment of the present invention provides an electronic device. The electronic device includes a body and a USB interface. The body includes a display screen. The USB interface is disposed on a tail part of the body. A step is disposed on the top of a rear side of the USB interface. The display screen is placed on the step.

A same part between the USB interface in this implementation and the USB Type-C interfaces in the foregoing implementations is not repeated.

According to the foregoing solutions, the embodiments of the present invention can increase the screen-to-body ratio of the electronic device with the USB Type-C interface.

DESCRIPTION OF EMBODIMENTS

Figure 1:
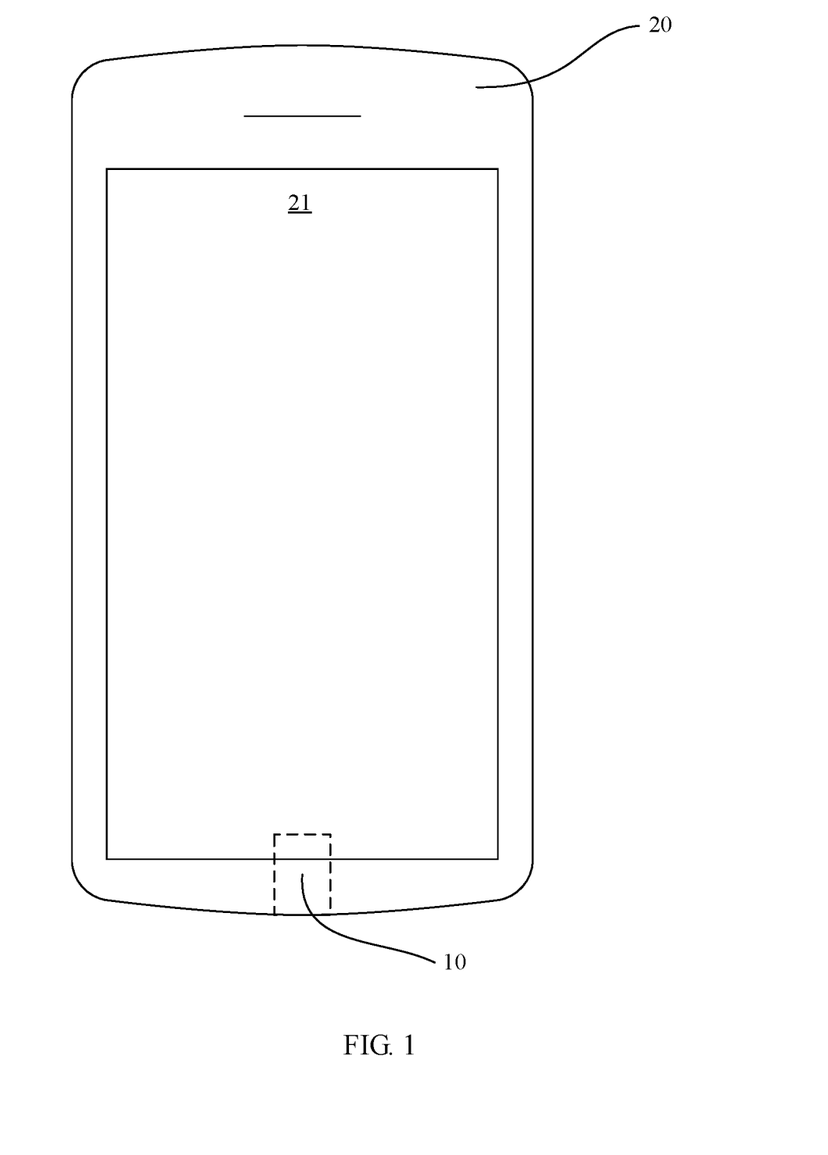
FIG. 1 is a schematic diagram of an electronic device with a USB Type-C interface according to a possible implementation of the present invention.

FIG. 1 is a schematic diagram of an electronic device according to a possible implementation of the present invention. As shown in FIG. 1, a body 20 and a USB Type-C interface 10 are provided on the electronic device. The USB Type-C interface 10 is disposed on a tail part of the body 20. The body further includes a display screen 21 disposed on a front surface of the body. The USB Type-C interface 10 is partially covered behind the display screen 21, to shorten a distance from an end part of the display screen 21 to an edge of the body, that is, to shorten a chin length of the electronic device, so as to increase a screen-to-body ratio.

It should be noted that, when the USB Type-C interface 10 is disposed on a side part of the body 20 or in another appropriate position, the screen-to-body ratio can also be increased by using this implementation of the present invention.

The USB Type-C interface mentioned in this application is defined according to the Universal Serial Bus Type-C Cable and Connector Specification Release 1.1 standard packet protocol (http://www.usb.org/developers/docs/usb_31_010516.zip) issued in Apr. 3, 2015 by the standardization organization USB 3.0 Promoter Group (http://www.usb.org/), especially the USB Type-C Specification Release 1.1, USB Type-C ECNs, and subsequent standard thereof to be possibly updated.

It should be noted that, the display screen 21 may be an LCD display screen or another display screen, may be a touchscreen, or may be a combination of a display screen and a touchscreen.

Figure 2:
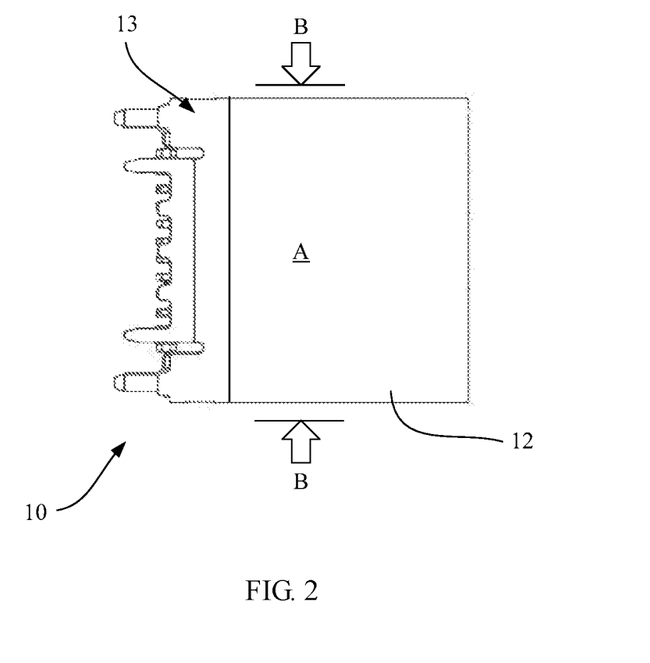
FIG. 2 is a plan view of a USB Type-C interface.

FIG. 2 is a plan view of a USB Type-C interface 10. As shown in FIG. 2, the USB Type-C interface 10 has two opposite sides A and two opposite sides B. In addition, a rear part of the USB Type-C interface 10 mentioned in this application is a position relative to a jack direction, that is, a part directing an opening of the USB Type-C interface 10 is a front part.

Figure 3:
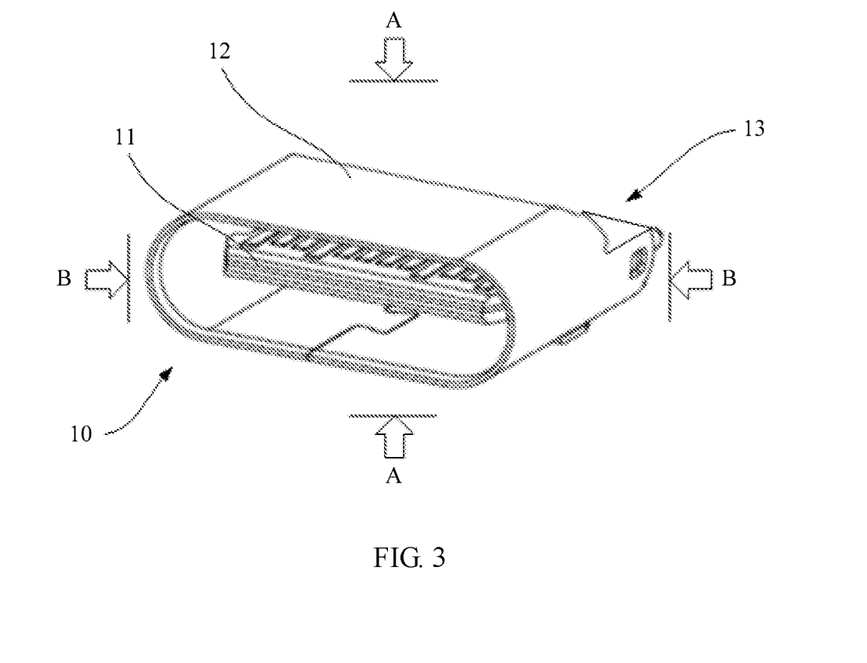
FIG. 3 is a main view of a USB Type-C interface.

FIG. 3 is a main view of a USB Type-C interface 10. As shown in FIG. 3, the USB Type-C interface 10 includes a conductive tongue 11 and a metal protective case 12. A step 13 is disposed on a side A of a rear part of the USB Type-C interface 10 and is configured to place a display screen 21, so that the USB Type-C interface 10 is partially covered by the display screen 21.

According to this possible implementation of the present invention, the USB Type-C interface 10 and the display screen 21 are arranged more compactly. This reduces a total length of the USB Type-C interface 10 and the display screen 21 when the USB Type-C interface 10 and the display screen 21 are disposed side by side, and avoids a total thickness increase thereof resulting from simply overlapping the USB Type-C interface 10 and the display screen 21 vertically, so as to control a thickness and increase a screen-to-body ratio.

Figure 15:
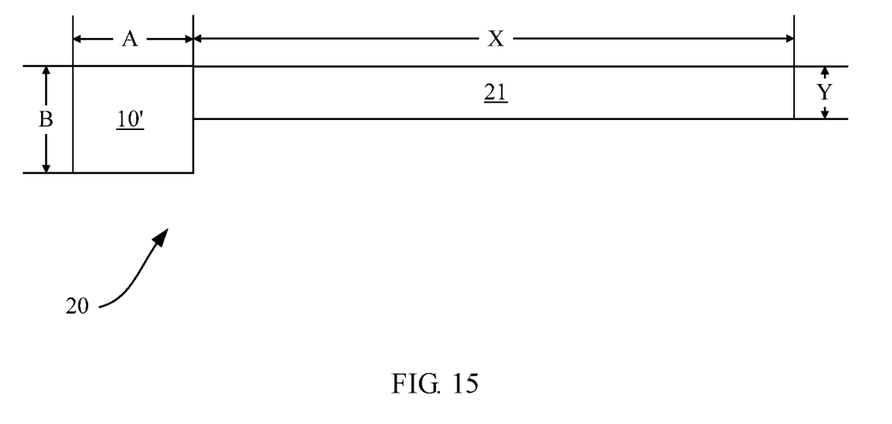
FIG. 15 shows a schematic diagram of disposing a USB Type-C interface without a step and a display screen side by side.

FIG. 15 shows a schematic diagram of disposing a USB Type-C interface 10' without a step and a display screen 21 side by side. As shown in FIG. 15, a length and a thickness of the USB Type-C interface 10' without a step are A and B, respectively. A length and a thickness of the display screen 21 are X and Y, respectively. In this case, after the USB Type-C interface 10' and the display screen 21 are disposed side by side, a total length and a total thickness of the two elements are A+X and B, respectively.

Figure 16:
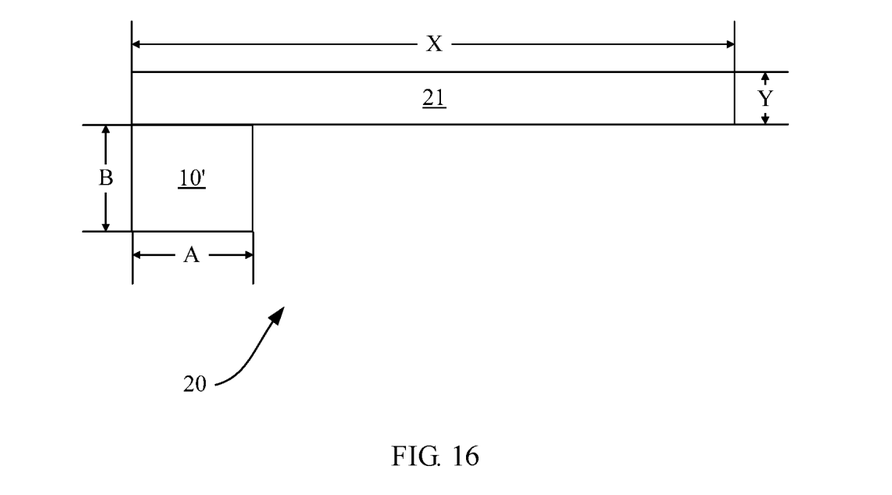
FIG. 16 shows a schematic diagram of disposing a USB Type-C interface without a step and a display screen in an overlapping manner.

FIG. 16 shows a schematic diagram of disposing a USB Type-C interface 10' without a step and a display screen 21 in an overlapping manner. As shown in FIG. 16, after the USB Type-C interface 10' and the display screen 21 are overlapped vertically, a total length of the two elements is X, and a total thickness of the two elements increases to B+Y.

Figure 17:
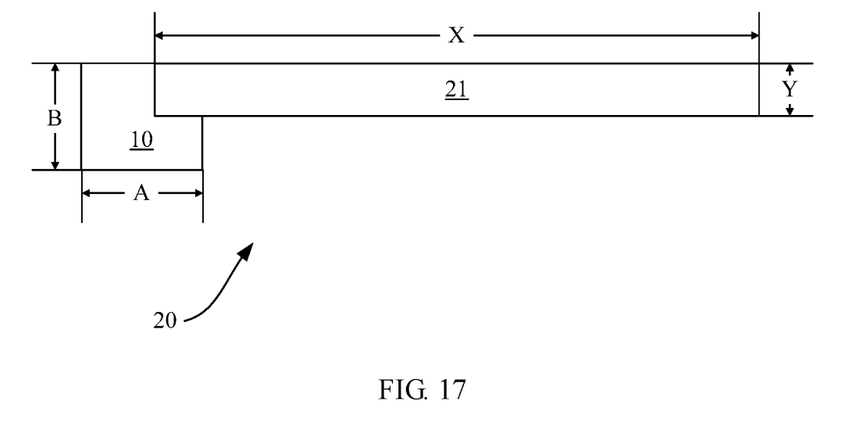
FIG. 17 shows a schematic diagram of disposing a USB Type-C interface with a step and a display screen in a combination manner according to a possible implementation of the present invention.

FIG. 17 shows a schematic diagram of disposing a USB Type-C interface 10 with a step and a display screen 21 in a combination manner according to a possible implementation of the present invention. As shown in FIG. 17, in this case, a total length of the two elements is less than A+X shown in FIG. 15, and a total thickness of the two elements is B and is less than B+Y shown in FIG. 16.

If a depth of a step 13 in a horizontal direction is 2 mm, a chin length (a length of a part, exposed out of the display screen 21, of the USB Type-C interface 10) in FIG. 17 is shortened by 2 mm compared with that in FIG. 15. If a length A of the USB Type-C interface 10 is 8 mm, the chin length is shortened to 6 mm from 8 mm, that is, decreased by 25%. A screen-to-body ratio is significantly increased when a thickness of a body 20 keeps unchanged. This provides desirable user experience.

Figure 4:
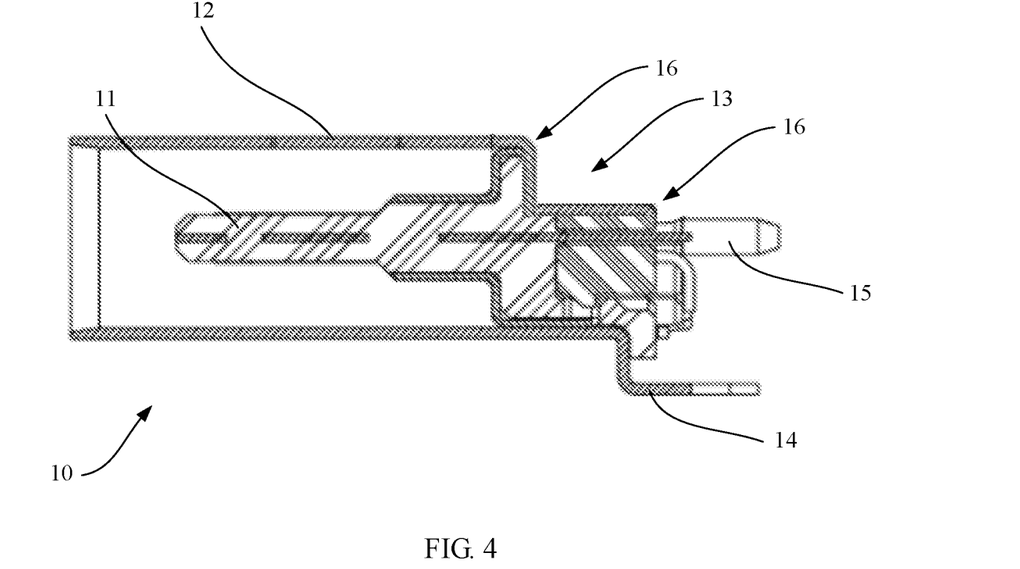
FIG. 4 is a cross section diagram of a USB Type-C interface according to a possible implementation of the present invention.

FIG. 4 is a cross section diagram of a USB Type-C interface 10 according to a possible implementation of the present invention. As shown in FIG. 4, a metal protective case 12 is connected to a rear part of a conductive tongue 11 and encloses the conductive tongue 11. A step 13 may be disposed on one of sides A of the rear part of the conductive tongue 11. A shape of the metal protective case 12 matches a shape of the step 13. For example, the metal protective case 12 may be closely fit with the step 13, or a specific gap is retained between the metal protective case 12 and the step 13. The step 13 may be directly exposed outside without being enclosed by the metal protective case 12.

In a possible implementation, the conductive tongue 11 includes a plastic base and a conducting wire passing through the plastic base. The plastic base supports the conducting wire and is fixedly connected to the metal protective case on a rear part of the USB Type-C interface 10.

In a possible implementation, the step 13 is formed when the plastic base is fabricated by means of injection molding, and the metal protective case 12 that is of a shape matching a shape of the step 13 is formed.

Alternatively, the step 13 may be obtained by performing processing on the rear part of the existing USB Type-C interface 10.

In a possible implementation, the metal protective case 12 is grounded.

In a possible implementation, the USB Type-C interface 10 further includes a pin 14. The pin 14 extends from the metal protective case 12 and is configured to fasten the USB Type-C interface 10 onto a body 20.

In a possible implementation, the pin 14 may extend towards the other side A on which no step 13 is disposed. The pin 14 may alternatively extend towards two sides B. The pin 14 may alternatively extend towards a rear side of the USB Type-C interface 10.

In a possible implementation, when providing a fastening function, the pin 14 may also provide a conductive function.

In a possible implementation, the USB Type-C interface 10 further includes a conductive part 15. The conductive part 15 is electrically connected to the rear part of the conductive tongue 11 and is configured to conduct a current between the body 20 and the conductive tongue 11.

It should be noted that the conductive part 15 may be a metal wire that is easily bent, or may be a metal sheet or another conductor that is not easily bent.

In a possible implementation, an arc transition part 16 is provided on the step 13, so that a structure of the USB Type-C interface 10 at the step 13 is smooth, and safety is increased.

In a possible implementation, the metal protective case 12 is formed integrated, and the arc transition part 16 is bent. This is easily implemented technically in processing.

Figure 5:
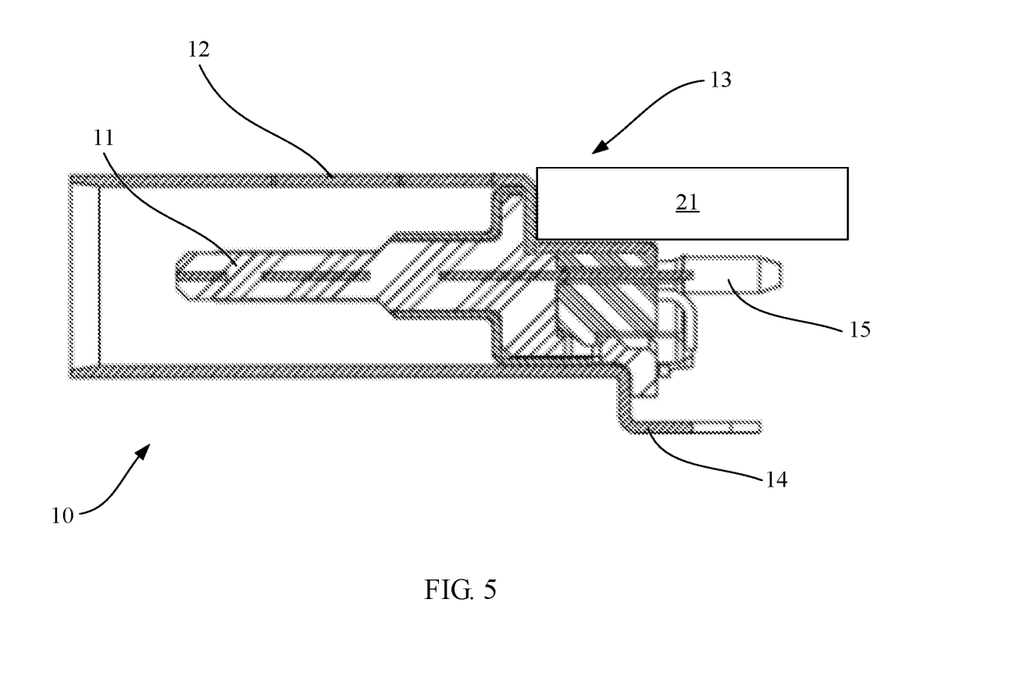
FIG. 5 is a schematic diagram of a combination of a USB Type-C interface and a display screen according to the foregoing possible implementations of the present invention.

FIG. 5 is a schematic diagram of a combination of the USB Type-C interface 10 and the display screen 21 according to the foregoing possible implementations of the present invention. As shown in FIG. 5, an end of the display screen 21 is disposed on the step 13, so that the display screen 21 and the USB Type-C interface 10 are staggered. A part of the USB Type-C interface 10, for example, the conductive part 15 and the pin 14, are hidden behind the display screen 21. In this possible implementation of the present invention, both a total length and a total height of the USB Type-C interface 10 and the display screen 21 are decreased after the USB Type-C interface 10 is combined with and the display screen 21, and a structure thereof becomes more compact.

In a possible implementation, a depth of the step 13 in a horizontal direction ranges from 0.5 mm to 2 mm, so that the total length and the total height of the USB Type-C interface 10 and the display screen 21 are decreased by 0.5 mm to 2 mm after the USB Type-C interface 10 is combined with the display screen 21.

In a possible implementation, a part, jointed with the display screen 21, of the step 13 is of a shape that matches a shape of the display screen 21, so that the step 13 is more closely combined with the display screen 21. For example, a cross section of an edge part of the display screen 21 is a rectangle, and a cross section of the step 13 is also a rectangle, so that the display screen 21 is placed on the step 13 firmly.

In a possible implementation, a height of the USB Type-C interface 10 matches a height of the display screen 21 after the USB Type-C interface 10 is combined with the display screen 21. For example, a depth of the step 13 in a vertical direction matches a thickness of the display screen 21, so that the side A, on which the step 13 is disposed, of the USB Type-C interface 10 is leveled with an upper surface of the display screen 21, to facilitate placing another element inside an electronic device.

Figure 6:
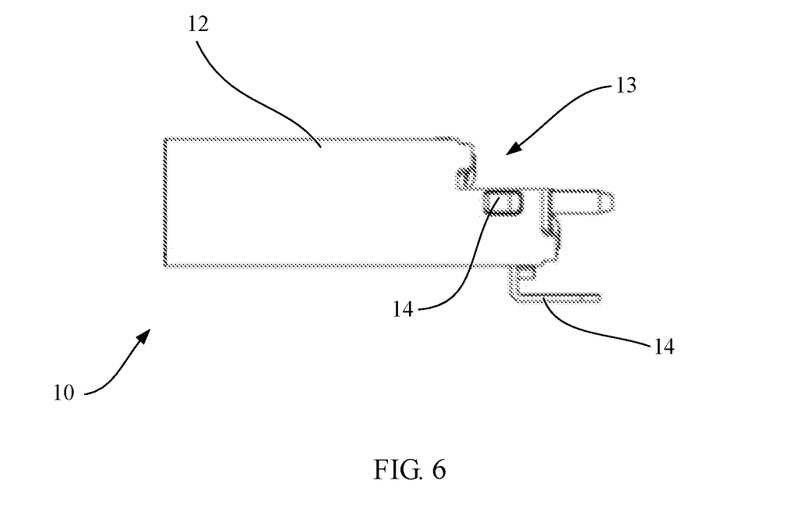
FIG. 6 is a schematic diagram of a USB Type-C interface according to another possible implementation of the present invention.

FIG. 6 is a schematic diagram of a USB Type-C interface 10 according to another possible implementation of the present invention. As shown in FIG. 6, a difference from FIG. 4 lies in that a pin 14 is further disposed on a side B of a metal protective case 12 of the USB Type-C interface 10, so as to provide a better fastening effect.

Figure 7:
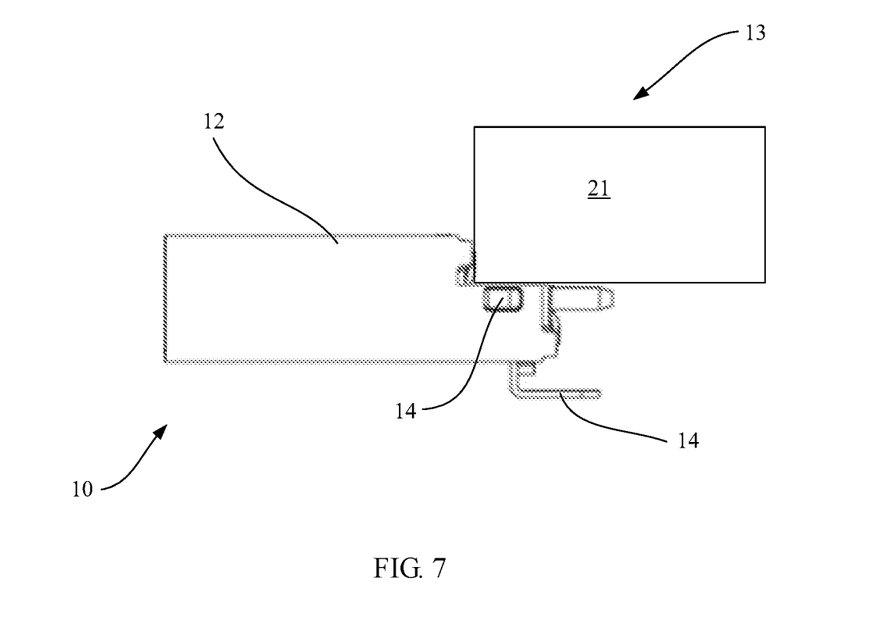
FIG. 7 is a schematic diagram of a combination of a USB Type-C interface and a display screen according to the foregoing possible implementations of the present invention.

FIG. 7 is a schematic diagram of a combination of the USB Type-C interface 10 and the display screen 21 according to the foregoing possible implementations of the present invention. As shown in FIG. 7, the display screen 21 is placed on the step 13, to reduce a total length of the display screen 21 and the step 13 after the display screen 21 is combined with the step 13, and to increase a screen-to-body ratio.

Figure 8:
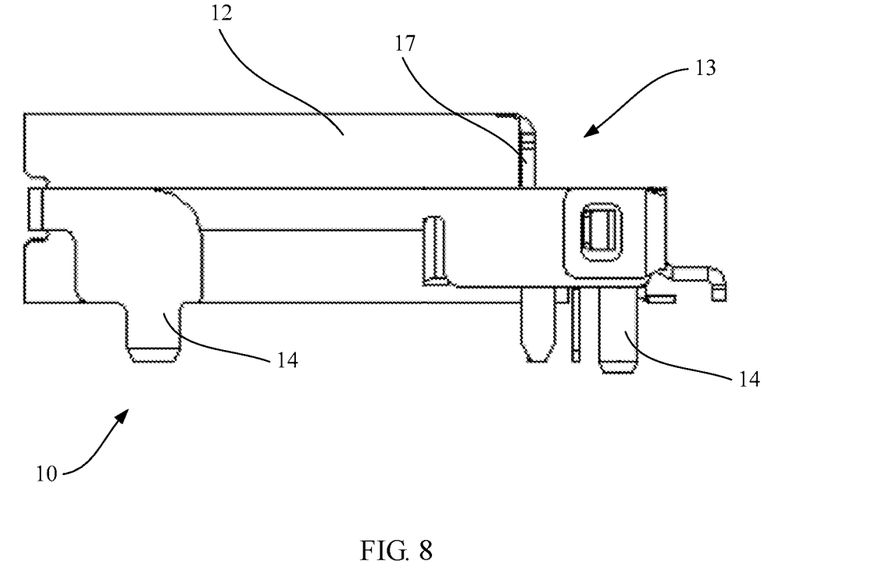
FIG. 8 is a schematic diagram of a USB Type-C interface according to another possible implementation of the present invention.

FIG. 8 is a schematic diagram of a USB Type-C interface 10 according to still another possible implementation of the present invention. As shown in FIG. 8, a difference from FIG. 4 lies in that a pin 14 is further disposed at the bottom of a front part of a metal protective case 12 of the USB Type-C interface 10, so as to provide a better fastening effect.

In a possible implementation, a cushion layer 17 is disposed on a surface of a step 13 to protect a display screen 21, so as to avoid damage to the display screen 21 caused by extrusion during an installation process or daily use.

It should be noted that the cushion layer 17 may be a rubber coating, a plastic coating, a foam coating, a resin coating, a fiber coating, a glue coating, or the like that is made of a flexible material.

It is easy to understand that the cushion layer 17 may be applicable to all possible embodiments of the present invention.

Figure 9:
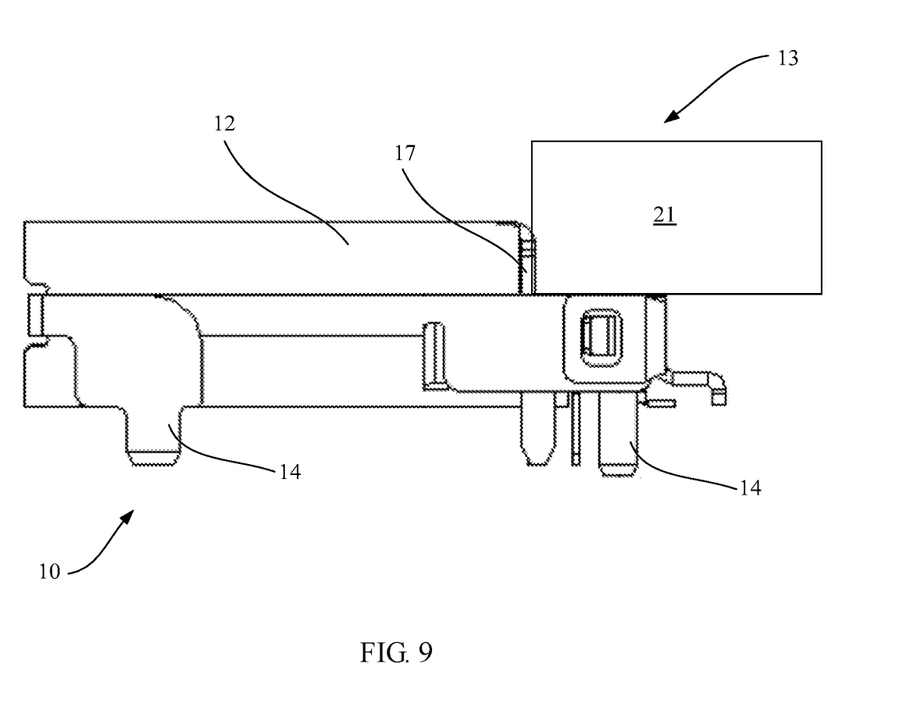
FIG. 9 is a schematic diagram of a combination of a USB Type-C interface and a display screen according to the foregoing possible implementations of the present invention.

FIG. 9 is a schematic diagram of a combination of the USB Type-C interface 10 and the display screen 21 according to the foregoing possible implementations of the present invention. As shown in FIG. 9, after the display screen 17 is placed on the step 13, the cushion layer 17 protects the display screen 17.

Figure 10:
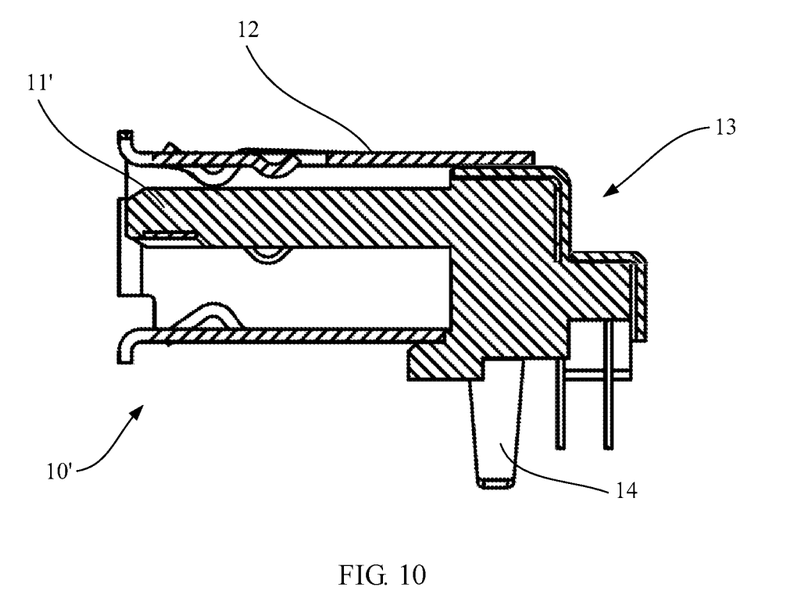
FIG. 10 is a cross section diagram of a USB interface according to another possible implementation of the present invention.

FIG. 10 is a cross section diagram of a USB interface 10' according to yet another possible implementation of the present invention. As shown in FIG. 10, a same part between the USB interface 10' and the USB Type-C interface 10 in the foregoing embodiments is not repeated, and a difference thereof lies in that a position of a connection tongue 11' is close to one of sides A of a metal protective case 12.

In a possible implementation, the USB interface 10' may be a USB Type-A interface or a USB Type-B interface, for example, a Standard-A interface, a Mini Type-A interface, a Micro Type-A interface, a Standard-B interface, a Mini-B interface, a Micro-B interface, a Micro-B USB 3.0 interface, or a Standard-B USB 3.0 interface. The USB interface 10' and the USB Type-C interface 10 may be different only in size.

Figure 11:
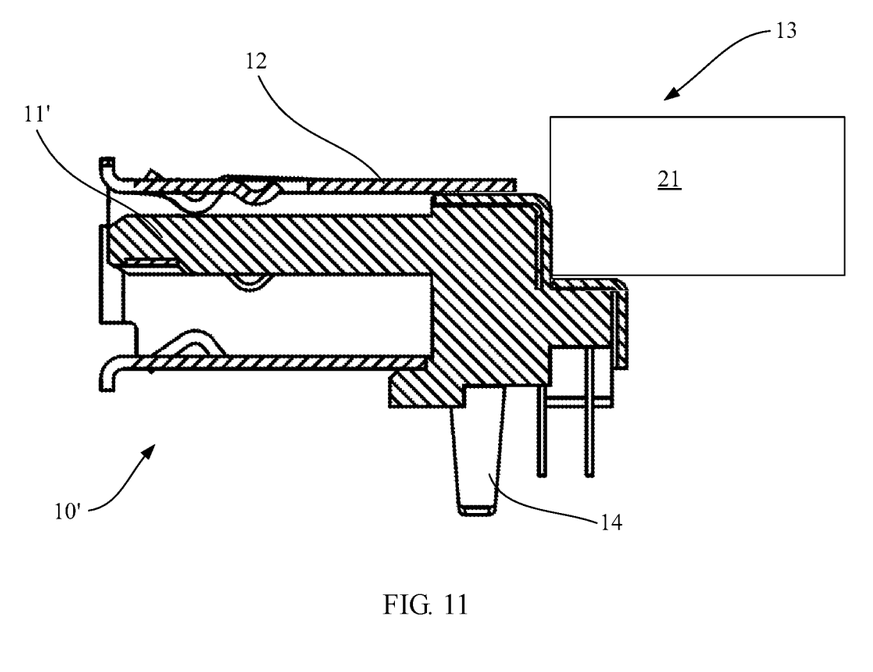
FIG. 11 is a schematic diagram of a combination of a USB interface and a display screen according to the foregoing possible implementations of the present invention.

FIG. 11 is a schematic diagram of a combination of the USB interface 10' and the display screen 21 according to the foregoing possible implementations of the present invention. As shown in FIG. 11, the display screen 21 is placed on the step 13. This may decrease a total length of the USB interface 10' and the display screen 21 after the USB interface 10' is combined with the display screen 21, so that an internal structure of an electronic device becomes more compact.

Figure 12:
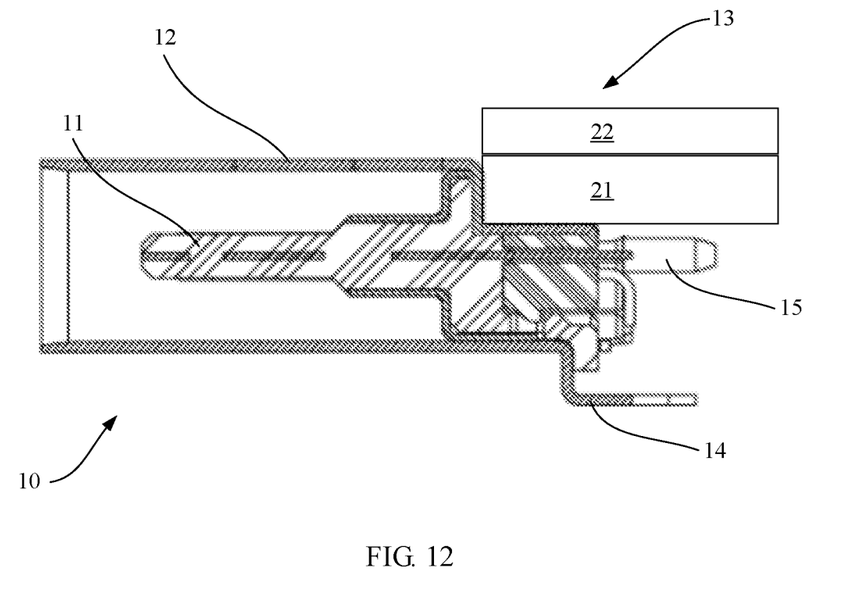
FIG. 12 is a schematic diagram of a combination of a USB Type-C interface and a display screen according to another possible implementation of the present invention.

FIG. 12 is a schematic diagram of a combination of a USB interface 10 and a display screen 21 according to still yet another possible implementation of the present invention. As shown in FIG. 12, a same part between this implementation and the foregoing implementations is not repeated. A difference from the foregoing embodiments lies in that an electronic device further includes a touchscreen 22. The touchscreen 22 and the display screen 21 are separated from each other and overlapped vertically.

In a possible implementation, a size of a step 13 matches a size of the display screen 21, so that a side A, on which the step 13 is disposed, of the USB Type-C interface 10 is leveled with an upper surface of the display screen 21, to facilitate placing the touchscreen 22.

It should be noted that a position of the touchscreen 22 and a position of the display screen 21 can be exchanged, that is, the touchscreen 22 is placed on the step 13.

Figure 13:
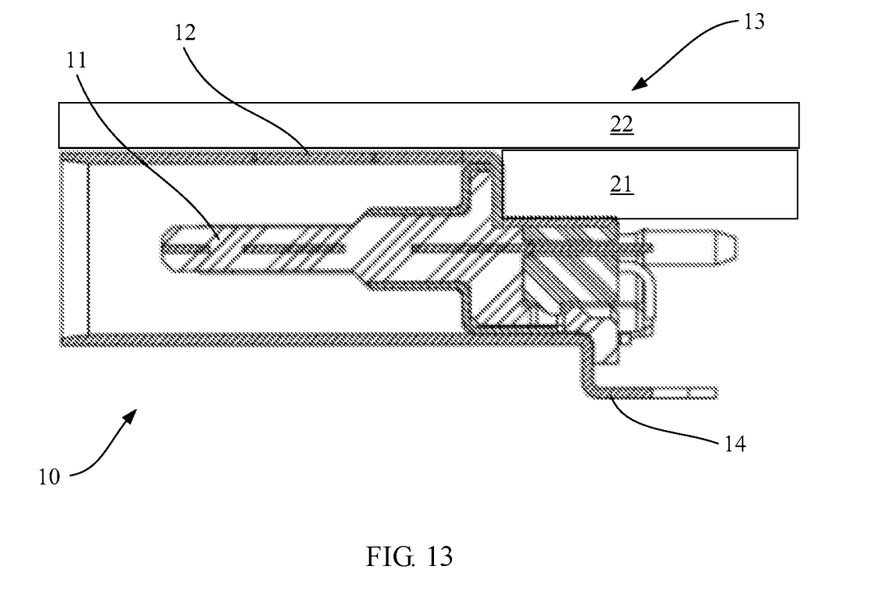
FIG. 13 is a schematic diagram of a combination of a USB Type-C interface and a display screen according to another possible implementation of the present invention.

FIG. 13 is a schematic diagram of a combination of a USB interface and a display screen according to a further possible implementation of the present invention. As shown in FIG. 13, a same part between this implementation and the implementation shown in FIG. 12 is not repeated. A difference thereof lies in that a size of a step 13 matches a size of the display screen 21, so that a side A, on which the step 13 is disposed, of the USB Type-C interface 10 is leveled with an upper surface of the display screen 21, and a touchscreen 22 is disposed on a plane formed by splicing the USB Type-C interface 10 and display screen 21. In this implementation, an internal structure of an electronic device becomes more compact by combining the USB Type-C interface 10, the display screen 21, and the touchscreen 22.

In a possible implementation, the size of the step 13 may alternatively not match the size of the display screen 21, that is, a thickness of the display screen 21 is greater than a depth of the step 13 in a vertical direction, so that a gap is retained between the touchscreen 22 and an upper surface of the USB Type-C interface 10, to arrange another structure such as a cushion pad, a support structure, and a circuit cable.

Figure 14:
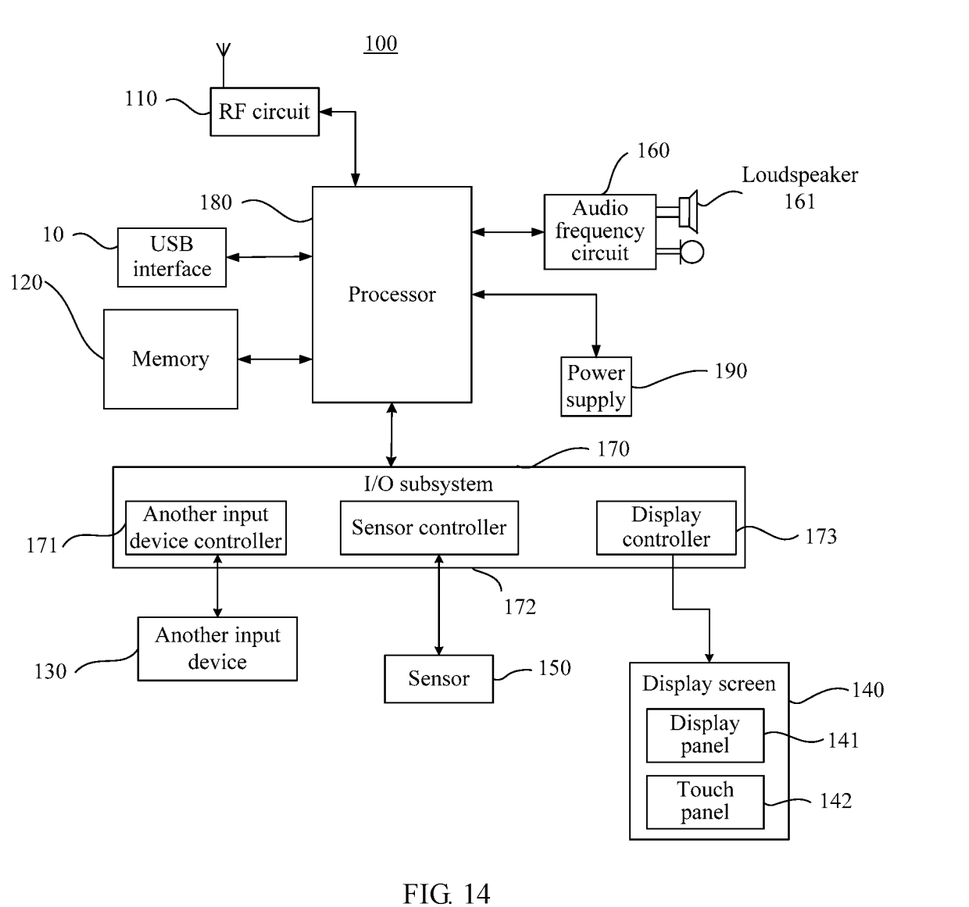
FIG. 14 shows a block diagram of a partial structure of an electronic device according to a possible implementation of the present invention.

FIG. 14 shows a block diagram of a partial structure of an electronic device according to a possible implementation of the present invention.

The electronic device in this embodiment of the present invention may be a mobile terminal. The mobile terminal may include a mobile phone, a tablet computer, a PDA (Personal Digital Assistant, personal digital assistant), a POS (Point of Sales, point of sales), an in-vehicle computer, and the like.

For example, the mobile terminal is a mobile phone. FIG. 14 shows a block diagram of a partial structure of a mobile phone 100 related to an embodiment of the present invention. Referring to FIG. 14, the mobile phone 100 includes components such as an RF (Radio Frequency, radio frequency) circuit 110, a memory 120, another input device 130, a display screen 140, a sensor 150, an audio frequency circuit 160, an I/O subsystem 170, a processor 180, and a power supply 190. Persons skilled in the art can understand that the mobile phone structure shown in FIG. 14 does not constitute a limitation on the mobile phone, and the mobile phone may include more or fewer components than those shown in the figure, a combination of some components, a part of some components, or components disposed differently. Persons skilled in the art can understand that the display screen 140 is a user interface (UI, User Interface), and the mobile phone 100 may include more or fewer user interfaces than those shown in the figure.

The following describes each constituent component of the mobile phone 100 in detail with reference to FIG. 14.

The RF circuit 110 may be configured to: send and receive information, or send and receive a signal during a call, and in particular, after receiving downlink information of a base station, send the downlink information to the processor 180 for processing; and send related uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may also communicate with a network and another device by means of wireless communications. Any communications standard or protocol may be used for the wireless communications, including but not limited to GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution, Long Term Evolution), an email, an SMS (Short Messaging Service, short message service), and the like.

The memory 120 may be configured to store a software program and a module. The processor 180 runs the software program and the module that are stored in the memory 120, so as to execute various functions and applications of the mobile phone 100 and data processing. The memory 120 may mainly include a program storage area and a data storage area. The program storage area may store an operating system, an application program required by at least one function (for example, an audio playback function and an image playback function), and the like. The data storage area may store data (for example, audio data and a phone book) created according to usage of the mobile phone 100, and the like. In addition, the memory 120 may include a high-speed random access memory, and may further include a nonvolatile memory, for example, at least one disk storage device, a flash memory device, or another volatile solid-state storage device.

The another input device 130 may be configured to receive input digital or character information and generate a key signal input related to user setting and function control of the mobile phone 100. Specifically, the another input device 130 may include but is not limited to one or more of a physical keyboard, a function key (for example, a volume control key or an on/off key), a trackball, a mouse, a joystick, an optical mouse (the optical mouse is a touch-sensitive surface that does not display a visual output, or an extension of a touch-sensitive surface formed by a touchscreen), or the like. The another input device 130 is connected to another input device controller 171 of the I/O subsystem 170, and performs signal exchange with the processor 180 under control of the another device input controller 171.

The display screen 140 may be configured to display information entered by a user or information provided for the user and various menus of the mobile phone 100; and may also receive a user input. Specifically, the display screen 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142, also referred to as a touchscreen, a touch-sensitive screen, or the like, may collect a touch or non-touch operation performed by a user on or near the touch panel 142 (for example, an operation performed on or near the touch panel 142 by the user by using a finger, a stylus, or any other suitable object or accessory; and a somatosensory operation may also be included, and the operation includes a single-point control operation, a multi-point control operation, and other types of operations), and drive a corresponding connection apparatus according to a preset program. Optionally, the touch panel 142 may include two parts: a touch detection apparatus and a touch controller. The touch detection apparatus detects a touch orientation and a touch gesture of the user, detects a signal brought by a touch operation, and transfers the signal to the touch controller. The touch controller receives touch information from the touch detection apparatus, converts the touch information into information that the processor can process, and sends the information that the processor can process to the processor 180; and can receive and execute a command sent by the processor 180. In addition, the touch panel 142 may be implemented by using multiple types, such as a resistive type, a capacitive type, an infrared type, and a surface acoustic wave type. The touch panel 142 may also be implemented by using any technology that is to be developed in future. Further, the touch panel 142 may cover the display panel 141. The user may perform, according to content displayed on the display panel 141 (the displayed content includes but is not limited to a soft keyboard, a virtual mouse, a virtual key, an icon, or the like), an operation on or near the touch panel 142 that covers the display panel 141. After detecting a touch operation on or near the touch panel 142, the touch panel 142 transmits information about the touch operation to the processor 180 by using the I/O subsystem 170 to determine a touch event type and determine a user input. Then, the processor 180 provides a corresponding visual output on the display panel 141 according to the touch event type and according to the user input by using the I/O subsystem 170. In FIG. 14, the touch panel 142 and the display panel 141 act as two independent parts to implement an input and input function of the mobile phone 100. However, in some embodiments, the touch panel 142 and the display panel 141 may be integrated to implement the input and output function of the mobile phone 100.

The mobile phone 100 may further include at least one sensor 150 such as a light sensor, a motion sensor, and another sensor. Specifically, the light sensor may include an ambient light sensor and a proximity sensor. The ambient light sensor may adjust luminance of the display panel 141 according to brightness of ambient light. The proximity sensor may turn off the display panel 141 and/or backlight when the mobile phone 100 moves close to an ear. As a type of motion sensor, an accelerometer sensor may detect accelerations in all directions (three axes in general), may detect, in a stationary state, a value and a direction of gravity, and may be applied to a mobile phone posture recognition application (for example, screen switching between a landscape orientation and a portrait orientation, related games, and magnetometer posture calibration), a vibration recognition related function (for example, a pedometer or tapping), and the like. Other sensors, such as a gyroscope, a barometer, a hygrometer, a thermometer, and an infrared sensor, may also be configured in the mobile phone 100, and details are not described herein.

The audio frequency circuit 160, a loudspeaker 161, and a microphone 162 may provide an audio interface between the user and the mobile phone 100. The audio frequency circuit 160 may transmit, to the loudspeaker 161, an electrical signal that is obtained by converting received audio data. The loudspeaker 161 converts the electrical signal into a sound signal and outputs the sound signal. In addition, the microphone 162 converts a collected sound signal into an electrical signal. The audio frequency circuit 160 receives and converts the electrical signal into audio data and outputs the audio data to the RF circuit 108, to send the audio data to, for example, another mobile phone, or outputs the audio data to the memory 120 for further processing.

The I/O subsystem 170 is configured to control an external input/output device. The external input/output device may include the another device input controller 171, a sensor controller 172, and a display controller 173. Optionally, one or more other input control device controllers 171 receive a signal from the another input device 130 and/or send a signal to the another input device 130. The another input device 130 may include a physical button (a press button, a rocker button, or the like), a dial pad, a slide switch, a joystick, a click scroll wheel, and an optical mouse (the optical mouse is a touch-sensitive surface that does not display a visual output, or an extension of a touch-sensitive surface formed by a touchscreen). It should be noted that the another input control device controller 171 may be connected to one or more of the foregoing devices. The display controller 173 in the I/O subsystem 170 receives a signal from the display screen 140 and/or sends a signal to the display screen 140. After the display screen 140 detects a user input, the display controller 173 converts the detected user input into interaction with an object on a user interface displayed on the display screen 140, that is, to implement man-machine interaction. The sensor controller 172 may receive a signal from one or more sensors 150 and/or send a signal to one or more sensors 150.

The processor 180, a control center of the mobile phone 100, is connected to various parts of the entire mobile phone by using various interfaces and lines, and executes various functions of the mobile phone 100 and data processing by running or executing a software program and/or a module stored in the memory 120 and invoking data stored in the memory 120, so as to perform overall monitoring on the mobile phone. Optionally, the processor 180 may include one or more processing units. Preferably, an application processor and a modem processor may be integrated in the processor 180. The application processor mainly processes an operating system, a user interface, an application program, and the like. The modem processor is mainly configured to deal with wireless communications. It can be understood that the modem processor may alternatively not be integrated into the processor 180.

The mobile phone 100 further includes the power supply 190 (such as a battery) that supplies power to each component. Preferably, the power supply may be logically connected to the processor 180 by using a power management system, so that functions such as charging and discharging management and power consumption management are implemented by using the power management system.

Although not shown, the mobile phone 100 may further include a camera, a Bluetooth module, or the like, and details are not described herein.

In summary, what is described above is merely examples of embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A USB Type-C interface, comprising:
   a conductive tongue; and
   a metal protective case, wherein a rear part of the conductive tongue is connected to the metal protective case, the metal protective case encloses the conductive tongue, the conductive tongue comprises a step at a rear side of the conductive tongue, the step is configured to place a display screen, and a shape of the metal protective case matches a shape of the step.

2. The USB Type-C interface according to claim 1, further comprising:
   a pin, wherein the pin extends from the metal protective case and is configured to fasten the USB Type-C interface onto a body of an electronic device.

3. The USB Type-C interface according to claim 2, wherein the pin is disposed at the bottom of the metal protective case.

4. The USB Type-C interface according to claim 3, wherein the pin is further disposed on two sides of the metal protective case.

5. The USB Type-C interface according to claim 1, further comprising:
   a conductive part, wherein the conductive part is electrically connected to the rear part of the conductive tongue and is configured to conduct a current between the body and the conductive tongue.

6. The USB Type-C interface according to claim 1, wherein an arc transition part is provided on the step.

7. The USB Type-C interface according to claim 1, wherein a part, jointed with the display screen, of the step is of a shape that matches a shape of the display screen.

8. The USB Type-C interface according to claim 1, wherein a depth of the step is predetermined, so that a height of the USB Type-C interface matches a height of the display screen after the USB Type-C interface is combined with the display screen.

9. The USB Type-C interface according to claim 1, wherein a cushion layer is provided on a surface of the step.

10. An electronic device, comprising:
    a body with a display screen; and
    a USB Type-C interface, disposed on a tail part of the body, wherein the USB Type-C interface comprises:
    a conductive tongue; and
    a metal protective case, wherein a rear part of the conductive tongue is connected to the metal protective case, the metal protective case encloses the conductive tongue, the conductive tongue comprises a step at a rear side of the conductive tongue, and a shape of the metal protective case matches a shape of the step,
    wherein the display screen is placed on the step.

11. The electronic device according to claim 10, wherein the USB Type-C interface further comprises:
    a pin, wherein the pin extends from the metal protective case and is configured to fasten the USB Type-C interface onto the body of the electronic device.

12. The electronic device according to claim 11, wherein the pin is disposed at a bottom of the metal protective case.

13. The electronic device according to claim 12, wherein the pin is further disposed on two sides of the metal protective case.

14. The electronic device according to claim 10, wherein the USB Type-C interface further comprises:
    a conductive part, wherein the conductive part is electrically connected to the rear part of the conductive tongue and is configured to conduct a current between the body and the conductive tongue.

15. The electronic device according to claim 10, wherein an arc transition part is provided on the step.

16. The electronic device according to claim 10, wherein a part, jointed with the display screen, of the step is of the shape that matches a shape of the display screen.

17. The electronic device according to claim 10, a touchscreen, wherein the touchscreen and the display screen are separated from each other and overlapped vertically.

18. The electronic device according to claim 17, wherein a size of the step matches a size of the display screen, so that a top part of the USB Type-C interface is leveled with an upper surface of the display screen, and the touchscreen is disposed on a plane formed by the USB Type-C interface and the display screen.

19. An electronic device, comprising:
    a body with a display screen; and
    a USB interface, disposed on a tail part of the body, wherein the USB interface comprises:
    a conductive tongue; and
    a metal protective case, wherein a rear part of the conductive tongue is connected to the metal protective case, the metal protective case encloses the conductive tongue, the conductive tongue comprises a step at a rear side of the conductive tongue, and a shape of the metal protective case matches a shape of the step,
    wherein the step is disposed on the top of the conductive tongue, and the display screen is placed on the step.

* * * * *

UNITED STATES PATENT AND TRADEMARK OFFICE
CERTIFICATE OF CORRECTION

PATENT NO. : 10,749,998 B2
APPLICATION NO. : 16/092020
DATED : August 18, 2020
INVENTOR(S) : Xiaolong Wang et al.

Page 1 of 1

It is certified that error appears in the above-identified patent and that said Letters Patent is hereby corrected as shown below:

In the Claims

Column 11, Line 30, please delete "the" and add --a-- between "at" and "bottom".

Column 11, Line 35, please delete "1" and add --2-- between "claim" and ", further".

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*